United States Patent
Morimoto

(10) Patent No.: US 10,146,252 B2
(45) Date of Patent: Dec. 4, 2018

(54) AUTHENTICATION SYSTEM OF SYNCHRONIZING INSTANT TIMESTAMP AND A METHOD THEREOF

(71) Applicant: Nobuyoshi Morimoto, Taipei (TW)

(72) Inventor: Nobuyoshi Morimoto, Taipei (TW)

( * ) Notice: Subject to any disclaimer, the term of this patent is extended or adjusted under 35 U.S.C. 154(b) by 48 days.

(21) Appl. No.: 14/983,714

(22) Filed: Dec. 30, 2015

(65) Prior Publication Data

US 2016/0188892 A1      Jun. 30, 2016

(30) Foreign Application Priority Data

Dec. 31, 2014   (TW) .............................. 103146701 A

(51) Int. Cl.
| | | |
|---|---|---|
| *G06F 21/00* | (2013.01) | |
| *G06F 1/14* | (2006.01) | |
| *G06F 21/33* | (2013.01) | |
| *G06F 21/72* | (2013.01) | |
| *H04J 3/06* | (2006.01) | |
| *H04L 9/32* | (2006.01) | |

(52) U.S. Cl.
CPC ................ *G06F 1/14* (2013.01); *G06F 21/33* (2013.01); *G06F 21/725* (2013.01); *H04J 3/0635* (2013.01); *H04L 9/3297* (2013.01); *H04L 2209/60* (2013.01); *H04L 2463/121* (2013.01)

(58) Field of Classification Search
CPC .......... G06F 21/16; G06F 21/33; G06F 21/14; G06F 21/725; H04J 3/0635; H04L 9/3297; H04L 2209/60; H04L 2463/121
USPC ....................................................... 726/26
See application file for complete search history.

(56) References Cited

U.S. PATENT DOCUMENTS

| | | | | |
|---|---|---|---|---|
| 4,575,848 A | * | 3/1986 | Moore .................. | G04R 40/06 713/400 |
| 6,275,260 B1 | * | 8/2001 | Anderson .......... | H04N 1/32144 348/231.3 |
| 2002/0168082 A1 | * | 11/2002 | Razdan ................ | H04R 5/0335 381/379 |

(Continued)

OTHER PUBLICATIONS

T. Mundt, "Location dependent digital rights management," 10th IEEE Symposium on Computers and Communications (ISCC'05), 2005, pp. 617-622.*

(Continued)

*Primary Examiner* — Syed A Zaidi
(74) *Attorney, Agent, or Firm* — Chun-Ming Shih

(57) ABSTRACT

The present invention is related to an authentication system of synchronizing instant timestamp issued by a digital timestamp device and a method thereof. The digital timestamp device provides an instant machine time, and the provider end uses the digital timestamp device to stamp an instant digital timestamp on a digital content. Meanwhile, the provider end records the position of the digital content whereon the digital timestamp is stamped as a stamp position, and store the digital content, the instant digital timestamp, the stamp position, and the network location information together as a reliable digital content. The receiver end can retrieve the reliable digital content from a third party end or connect to the provider end to confirm whether the reliable digital content has the identical instant digital timestamp and stamp position to ensure the authenticity of the received reliable digital content.

3 Claims, 4 Drawing Sheets

(56) References Cited

U.S. PATENT DOCUMENTS

2004/0243806 A1* 12/2004 McKinley .......... G06Q 20/3823
 713/176
2005/0160272 A1* 7/2005 Teppler .................... H04L 9/12
 713/178

OTHER PUBLICATIONS

Dittmann, Jana, Martin Steinebach, and L. Ferri. "Watermarking protocols for authentication and ownership protection based on timestamps and holograms." Proc. spie. vol. 4675. 2002.*
C. Adams, P. Cain, D. Pinkas, R. Zuccherato, Internet X.509 Public Key Infrastructure Time-Stamp Protocol (TSP), RFC Editor, 2001.*

* cited by examiner

AUTHENTICATION SYSTEM OF SYNCHRONIZING INSTANT TIMESTAMP AND A METHOD THEREOF

BACKGROUND OF THE INVENTION

1. Field of the Invention

The present invention is related to an authentication system of synchronizing instant timestamp and a method thereof.

2. Description of the Prior Art

Previously, for verifying the authenticity of a signature or a stamp on a paper document, or the paper document truly exists at a specific time, an unbiased third party unit is required, such as a notarization from the court or an attorney, to confirm the existence of the paper document and the authenticity of the signature or stamp.

Recently, regarding that more people or company using personal computer to produce electric documents, the demand of requesting a third party electrical authentication to authenticate the producing time and the content of digital information therefore increases as well.

As aforementioned, many third electric authentication institutes published corresponding techniques for electric authentication service. These electric authentication services are used to ensure the un-deniability of an electric document. For example, such as the technologies request the provider end of the electric document to stamp an electric stamp on the electric document or stamp a reliable digital timestamp on an electric document with digital signature. The digital timestamp is configured to combine a reliable date and time with the electric document, which is very common in electric business trade.

In the prior art of reference of China published application No. CN 103281292A, it disclosed several embodiments of digital timestamp applications:

1. Online bid to ensure accurate bidding sequence of priority;
2. Electric vote to ensure the voting is only validated within a promised time period;
3. Publishing to ensure the text is published within a given time period;
4. Online gambling to ensure the bet is made before the event; and
5. Digital copyright management to ensure a certain content is accessible when it is permitted.

Among aforementioned applications, the common issue is that the consistency of machine time of an ideal digital timestamp. For an ideal digital timestamp mechanism, the accurate machine time is the most essential element in the verification. If the machine time of a digital timestamp of the electric document is simply provided by the provider end, since the machine time of a single machine is easily to be modified, the accuracy and the safety of the machine time is hard to be ensured. Besides, when the electric document or the electric trade process requires multiple digital timestamps from several parties, the difference or corrected difference of the machine time among these digital timestamps of these provider ends would be a potential problem seriously influencing the time verification accuracy of the digital timestamp.

To solve aforementioned problem of different machine times, some prior arts provide a plurality of solutions aiming on the machine time consistency issue. For example, the Network Time Protocol, NTP, is a protocol developed to provide a reliable time for single events. It allows different parties can evaluate the simultaneity of a event or time difference among different events. However, NTP is not capable of providing time approval and time indication.

The Wikipedia webpage of the title of "trusted timestamping" (http://en.wikipedia.org/wiki/Trusted_timestamping) describes several different solutions based on timestamp machine. But these solutions all rely on trusted authentication organizations or parties for providing timestamps.

In the one of the figures on that Wikipedia webpage, it describes that a provider end first proceeds an electric document by calculating hashes to generate a provider end hash information, and then sends the information to the trusted third party for electric authentication. The trusted third party adding a digital timestamp onto the provider end hash information and calculating the hashes again to generate the authentication end hash information. The authentication end hash information then is provided with a private key for encryption to generate an encrypted timestamp information. Then the encrypted timestamp information and the digital timestamp are transmitted back to the provider end simultaneously. The provider end then stores the electric document, the encrypted timestamp information, and digital timestamp together as a reliable timestamp electric document.

When a document receiver end retrieves the reliable timestamp electric document, and is demanded to prove the authenticity of the reliable timestamp electric document, it proceeds the electric document with the same hash calculating process done by the provider end to generate a receiver end hash information. The receiver end hash is then proceeded with the digital timestamp by calculating the same hash calculating process done by the trusted third party to generate a to-be-compared hash information. The encrypted timestamp information is decrypted by a public key to obtain the authentication end hash information. Then the to-be-compared hash information is compared with the authentication end hash information. If they are consistent, then the authentication passes, which means the reliable timestamp electric document received by the document receiver end is reliable, otherwise, the reliable timestamp electric document received by the document receiver end is not reliable.

As aforementioned description, the previous technologies of stamping digital timestamp on the electric document come with several disadvantages. It requires a reliable third party electric authentication providing reliable time and service of stamping authentication timestamp. And the third party electric authentication has to provide specific hash calculating procedure and verification service, such as Public Key Infrastructure technique, and these limitations make the technology more and more complex in stamping digital timestamp on the electric document. And, if the third party electric authentication fails in security, such as being attacked by hackers or backdoor programs, the security of authentication would be questioned as well, which would cause the whole authentication mechanism to lose its credibility and reliability.

Thus, to develop a simple, safer, and accurate system and method thereof for stamping digital timestamp on the electric document and verifying digital timestamp can be considered as an urgent issue.

SUMMARY OF THE INVENTION

As aforementioned, the conventional technologies face credibility and reliability issues in third party electric authentication providing service of authenticating electric document. One objective of the present invention is to ensure the provider end using a digital timestamp device to stamp a digital timestamp on the electric document and transmitting it to a receiver end without an intermediate third party calculating hashes and processing authentication. Another objective of the present invention is to ensure the receiver end getting authentication information from provider end after the electric document from the provider end is received by the receiver end and the authenticity of the electric document can be verified without using any third party authentication information.

One objective of the present invention is to provide a system for stamping a synchronizing instant timestamp on a digital content by a digital timestamp device. It comprises a digital timestamp device and a provider end. The digital timestamp device is configured to provide an instant machine time accurately, wherein the instant machine time is accurate to the minimum time unit that the digital timestamp device can presents. The provider end is configured to use the digital timestamp device to stamp the instant digital timestamp on a digital content, and record the position of the digital content whereon the digital timestamp is stamped as a stamp position, and store the digital content, the instant digital timestamp and the stamp position together as a reliable digital content.

One objective of the present invention is to provide a method for stamping a synchronizing instant timestamp on a digital content by a digital timestamp device, the method is applied between a digital timestamp device and a provider end and the method comprising steps as follows: the provider end provides a digital content; the provider end requests a stamp demand for the digital timestamp device to stamp on a particular position of the digital content; the digital timestamp device responses to the stamp demand and provides an instant digital timestamp to the provider end; the provider end records the position where the instant digital timestamp is stamped on the digital content as a stamp position; and the provider end stores the digital content, the instant digital timestamp, and the stamp position together as a reliable digital content.

Another objective of the present invention is to provide an authentication system of synchronizing instant timestamp issued by a digital timestamp device. The authentication system comprises a digital timestamp device, a provider end, and a receiver end. The digital timestamp device is configured to provide an instant machine time, wherein the instant machine time is accurate to the minimum time unit that the digital timestamp device can presents. The provider end is configured to use the digital timestamp device to stamp the instant digital timestamp on a digital content, and record the position of the digital content whereon the digital timestamp is stamped as a stamp position and a network location information, and store the digital content, the instant digital timestamp, the stamp position, and the network location information together as a reliable digital content. The receiver end is configured to receive the reliable digital content from a third party end, wherein the receiver end retrieves the instant digital timestamp, the stamp position, and the network location information from the reliable digital content. And the receiver end is connected to the provider end via network according to the network location information to confirm whether the provider end has the consistent reliable digital content, the instant digital timestamp, and the stamp position, when the received reliable digital content in the receiver end is confirmed to have the same reliable digital content, the instant digital timestamp, and the stamp position, then the receiver end confirms that the reliable digital content from the third party end is true.

Another objective of the present invention is to provide an authentication method of synchronizing instant timestamp issued by a digital timestamp device, the method is applied among a digital timestamp device, a provider end, and a receiver end which comprising following steps: the provider end provides a digital content; the provider end requests a stamp demand for the digital timestamp device to stamp on a particular position of the digital content; the digital timestamp device responses to the stamp demand and provides an instant digital timestamp to the provider end; the provider end records the position where the instant digital timestamp is stamped on the digital content as a stamp position; and the provider end stores the digital content, the instant digital timestamp, the stamp position, and the network location information together as a reliable digital content; the receiver end retrieves the reliable digital content from a third party end; the receiver end retrieves the instant digital timestamp, the stamp position, and the network location information when the receiver end issues a verification request; the receiver end is connected to the provider end via the network according to the network location information; the receiver end confirms the consistency of the reliable digital content to the provider end; the receiver end confirms whether the reliable digital content from the provider end has the consistent instant digital timestamp and the stamp position when the receiver end confirms that the provider end has the same reliable digital content; the reliable digital content is confirmed as true when then receiver end confirms that the received reliable digital content has the consistent instant digital timestamp and the stamp position.

BRIEF DESCRIPTION OF THE DRAWINGS

The techniques of present invention would be more understandable from the detailed description given herein below and the accompanying figures are provided for better illustration, and thus description and figures are not limitative for present invention, and wherein.

DETAILED DESCRIPTION OF THE PREFERRED EMBODIMENT

To clearly show the objectives, technologies, and features of the present invention, please find some preferred embodiments and figures regarding details of the present invention below. It should be noted that the embodiments are provided for further explaining but not limiting present invention.

Figure 1:
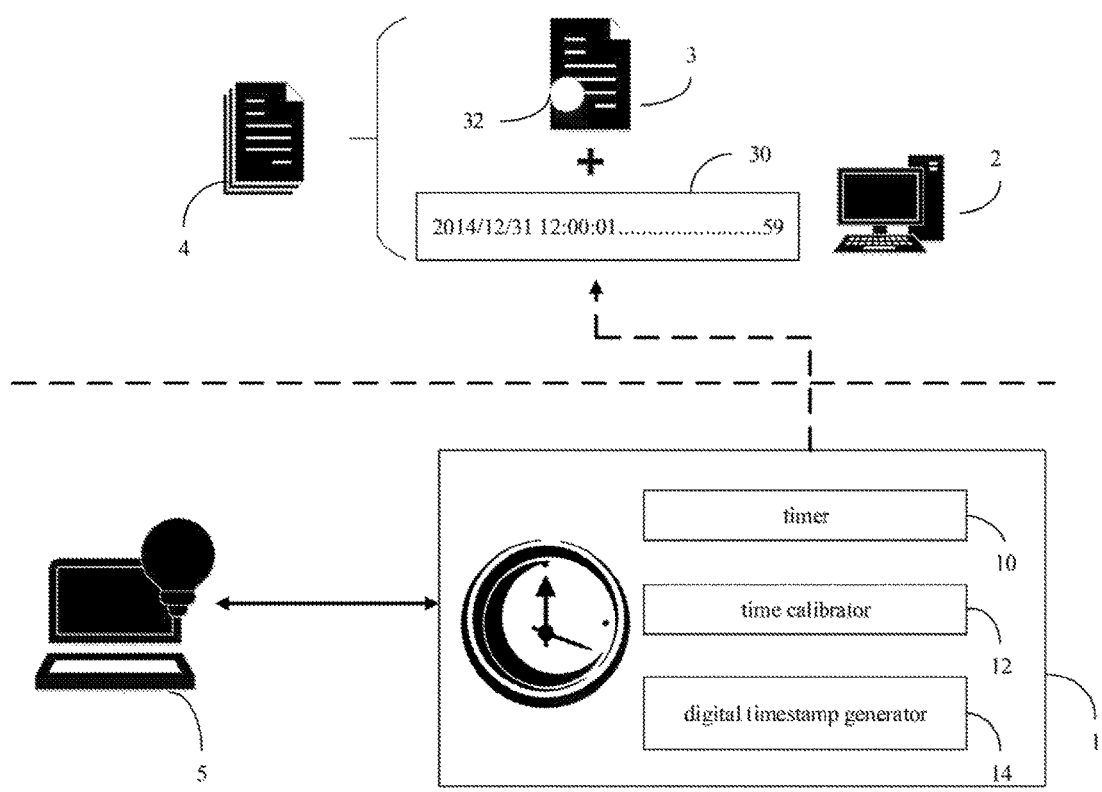
FIG. 1 shows the system component diagram of stamping synchronizing instant timestamp of the present invention.

FIG. 1 shows the components of the system for stamping a synchronizing instant timestamp on a digital content by a digital timestamp device. It comprises a digital timestamp device 1 and a provider end 2. The digital timestamp device 1 is configured to provide an instant machine time 10, wherein the instant machine time 10 is accurate to the minimum time unit that the digital timestamp device 1 can presents. Generally speaking, the minimum time unit provided by the digital timestamp device 1 is related to the data process bits of the operating system, OS, or application programs installed in the machine. The provider end 2 is configured to use the digital timestamp device 1 to stamp the instant digital timestamp 30 on a digital content 3, and record the position of the digital content 3 whereon the digital timestamp 30 is stamped as a stamp position 32, and store the digital content 3, the instant digital timestamp 30 and the stamp position 32 together as a reliable digital content 4.

Regarding to the present invention, the digital timestamp device 1 can be a hardware or software. The digital timestamp device 1 at least comprises a timer 10, a time calibrator 12, and a digital timestamp generator 14. The timer 10 is configured to output a time. The time calibrator 12 is connected to the timer 10 and a GMT provider 5, wherein the GMT provider 5 provides a GMT time, and the time calibrator 12 retrieves the GMT time from the GMT provider 5 and applies a time calibration algorithm (such as Network Time Protocol, NTP) to calibrate the GMT time as a calibrated time, and provides the calibrated time to the timer 10 as the correct time. The digital timestamp generator 14 is connected to the timer 10, and after the digital timestamp generator 14 is activated, it applies the present time of the timer 10 as the instant machine time and stamped on the stamp position 32 of digital content 3.

Regarding to the present invention, the time calibration algorithm of the timer calibrator 12 of the digital timestamp device 1 is configured to ensure the digital timestamp device 1 confirming a response time difference between several digital timestamp devices 1 located in different time zones via the GMT provider 5, and calibrate the GMT time as the calibrated time according to the GMT time of the GMT provider 5 and the response time difference.

Regarding to the present invention, the digital timestamp device 1 can be a wearable electric device or an implantable timer. Wherein, the wearable electric device can be a smart watch, smart glasses or a smart necklace, and other devices refer to the mobile devices contact to the human body directly or indirectly. Which means the provider end 2 can be a computer, a tablet, a multimedia device or smart phone which is able to be connected to network. The digital timestamp device 1 refers to the application programs installed in the aforementioned computer, tablet, multimedia device or smart phone. Thus, the provider end 2 can provide instant machine time from a built-in digital timestamp device 1 or an external timestamp device 1.

Regarding to the present invention, the provider end 2 applies the digital timestamp device 1 to stamp the instant digital timestamp 30 on the digital content 3, and record geometric position information, such as longitude and latitude coordinate values provided by GPS (Global Positioning System) for strengthen the reliability of the system. The geometric position information can be provided by the provider end 2 or digital timestamp device 1. Moreover, for protecting the privacy of provider end 2, the geometric position information can be provided by a provider end 2 or digital timestamp device 1 in the neighborhood, and the provider of the geometric position information can be noted and recorded as well.

Regarding to the present invention, to provide service of remote authentication to the reliable digital content 4 in network, the provider end 2 applies the digital timestamp device 1 to stamp the instant digital timestamp 30 on the digital content 3, and further records the network location information 34 for tracking the provider end 2. The network location information can be such as the Internet Protocol Address (IP address), Domain Name, or Media Access Control Address (MAC).

Figure 2:
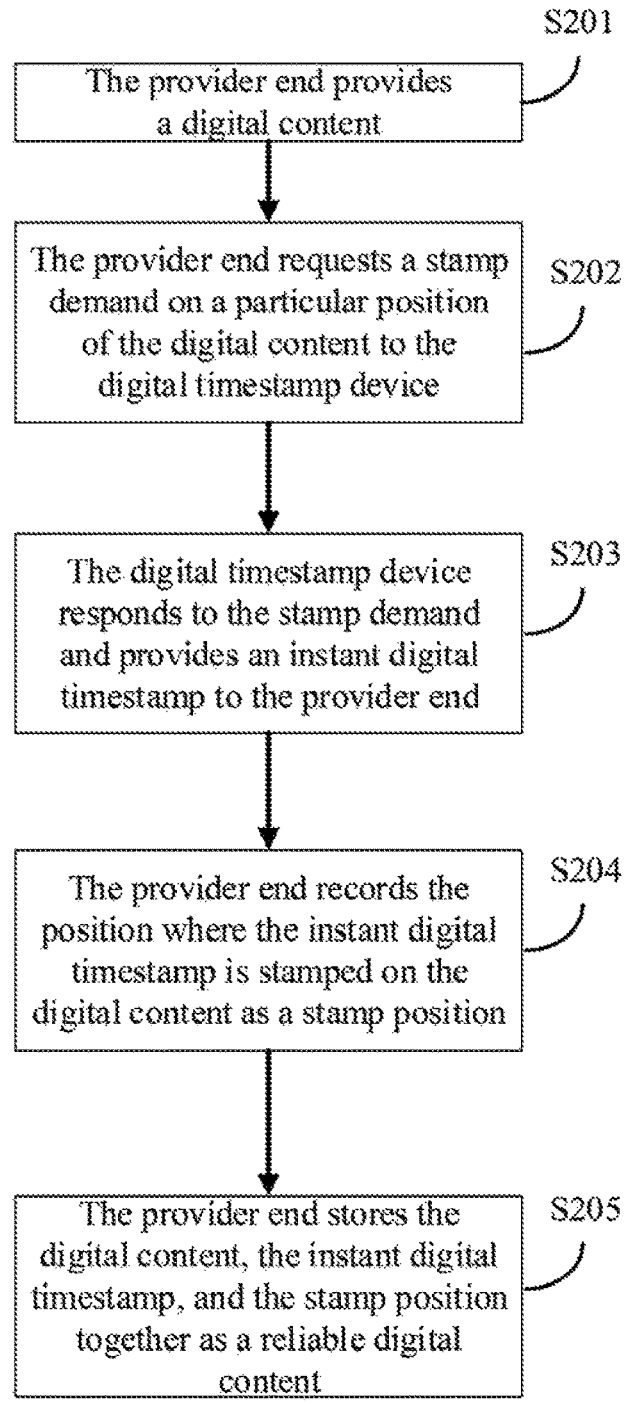
FIG. 2 shows the flow diagram of the method of stamping synchronizing instant timestamp on the digital content of the present invention.

FIG. 2 shows the flow diagram of the method for stamping a synchronizing instant timestamp on a digital content by a digital timestamp device. The method is applied between a digital timestamp device and a provider end and comprises steps as follows:

(S201) the provider end providing a digital content;

(S202) the provider end requesting a stamp demand for the digital timestamp device to stamp on a particular position of the digital content;

(S203) the digital timestamp device responding for the stamp demand and providing an instant digital timestamp to the provider end;

(S204) the provider end recording the position where the instant digital timestamp is stamped on the digital content as a stamp position; and (S205) the provider end storing the digital content, the instant digital timestamp, and the stamp position together as a reliable digital content.

In one embodiment of the present invention, the provider end can be a computer, a tablet, a multimedia device or smart phone which is able to be connected to network. In this embodiment, it takes computer as an example for further explanation. And the digital content can be a digital multimedia file, a digital audio file, a digital document, etc. In this embodiment, the PDF (Portable Document Format) format is taken as an example for further explanation. The digital timestamp device can be a wearable electric device or an implantable timer, and the wearable electric device can be a smart watch, smart glasses. In this embodiment, a smart watch is chosen for further explanation. When a user finishes a PDF by a computer, the user operates the computer to send out a stamp request to the smart watch, then the smart watch provides an instant digital timestamp to the computer. After that, the computer records the stamp position where the instant digital timestamp being stamped on the PDF. Then the computer stores the digital content, the instant digital timestamp and the stamp position together as a reliable digital content.

Figure 3:
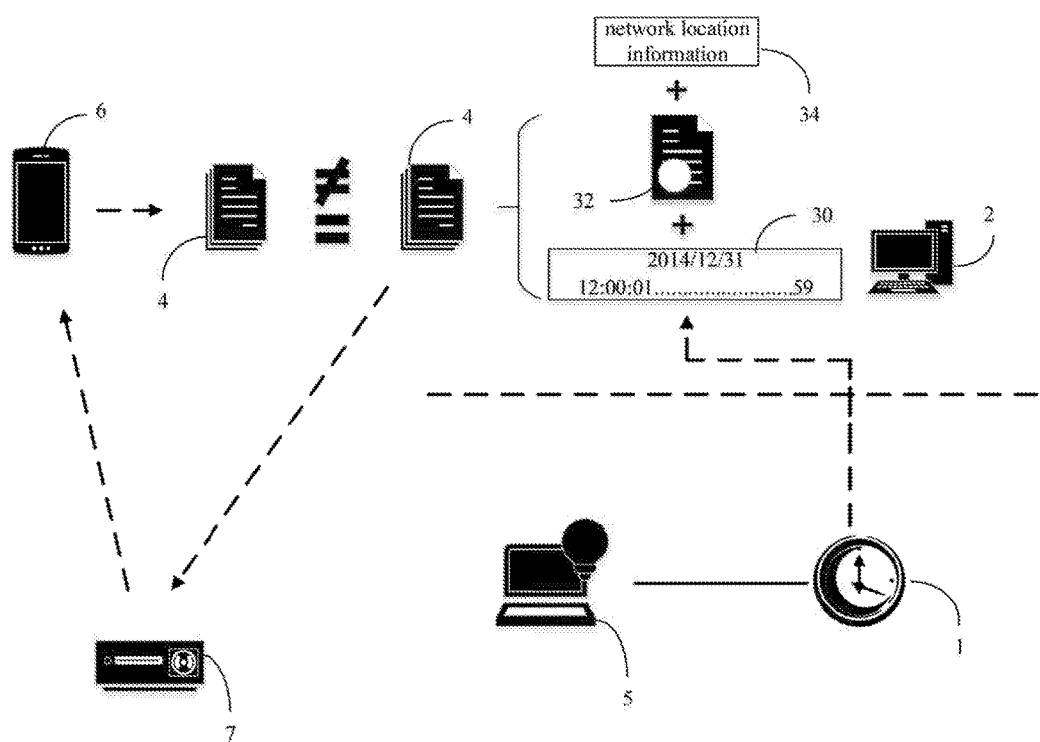
FIG. 3 shows the components of the authentication system of the present invention.

FIG. 3 shows an authentication system of synchronizing instant timestamp issued by a digital timestamp device 1 of the present invention, which is generally similar to the previous system for stamping a synchronizing instant timestamp on a digital content 3 by a digital timestamp device 1. The difference is that the authentication system further comprises a receiver end 6, and the provider end 2 is configured to use the digital timestamp device 1 to stamp the instant digital timestamp 30 on a digital content 3, and record the position of the digital content 3 whereon the digital timestamp is stamped as a stamp position 32 and a network location information 34, and store the digital content 3, the instant digital timestamp 30, the stamp position 32, and the network location information 34 together as a reliable digital content 4. The receiver end 6 is configured to receive the reliable digital content 4 from a third party end 7, wherein the receiver end 6 retrieves the instant digital timestamp 30, the stamp position 32, and the network location information 34 from the reliable digital content 4, and is connected to the provider end 2 via network according to the network location information 34 to confirm whether the provider end 2 has the same reliable digital content 4, the instant digital timestamp 30, and the stamp position 32, when the received reliable digital content 4 in the receiver end 6 is confirmed to have the same reliable digital content 4, then to check whether the instant digital timestamp 30 and the stand position received by the receiver end 6 is the same. If the consistency is confirmed, then the reliable digital content 4 from the third party end 7 is genuine.

Regarding to the present invention, the provider end 2 applies the digital timestamp device 1 to stamp the instant digital timestamp 30 on the digital content 3, and records bio-feature information (such as voice of the user, fingerprint, or DNA from the provider end 2), and the digital content 3, the instant digital timestamp 30, the stamp position 32, the network location information 34, and the bio-feature information together are stored as a reliable digital content 4 to enhance the reliability or un-deniability of the reliable digital content 4. Thus, even another person pirates the digital content 3, the instant digital timestamp 30, the stamp position 32, the network location information 34 of the provider end 2, but the person does not have the bio-feature from provider end 2, the person would not be capable of producing the identical reliable digital content 4.

Regarding to the present invention, when the reliable digital content 4 received by the receiver end 6 is considered as not genuine, the receiver end 6 can transmit a warning message to the provider end 2 according to the network location information 34 to inform the provider end 2 that the electric document might has been pirated or attacked by hackers.

Figure 4:
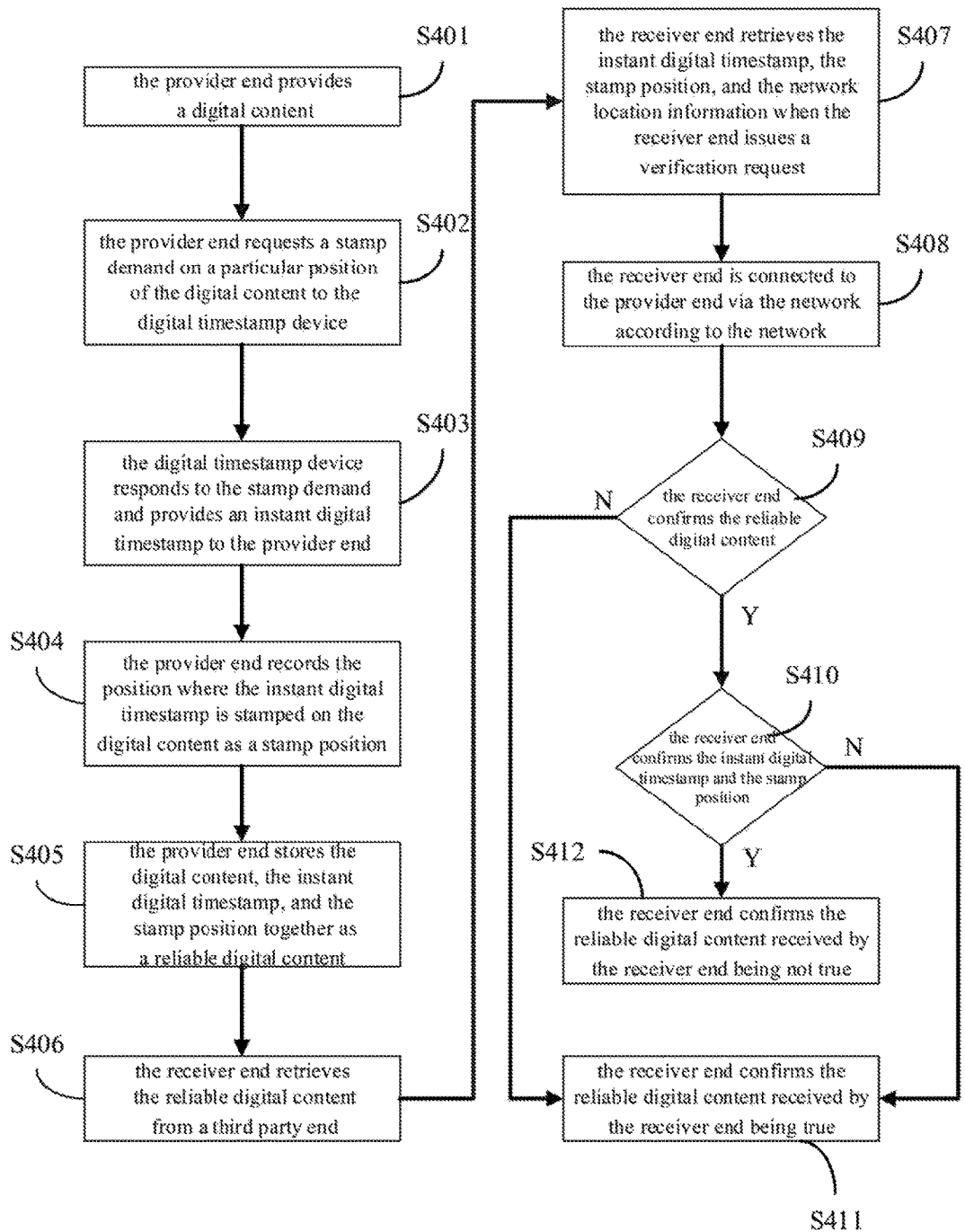
FIG. 4 shows the flow diagram of the authentication method of the present invention.

FIG. 4 shows the flow diagram of the authentication method of synchronizing instant timestamp issued by a digital timestamp device of the present invention. The method is applied among a digital timestamp device, a provider end, and a receiver end, which comprises steps as follows:

(S401) the provider end providing a digital content;

(S402) the provider end requesting a stamp demand for the digital timestamp device to stamp on a particular position of the digital content;

(S403) the digital timestamp device responding for the stamp demand and providing an instant digital timestamp to the provider end;

(S404) the provider end recording the position where the instant digital timestamp is stamped on the digital content as a stamp position; and (S405) the provider end storing the digital content, the instant digital timestamp, the stamp position, and the network location information together as a reliable digital content;

(S406) the receiver end retrieving the reliable digital content from a third party end;

(S407) the receiver end retrieving the instant digital timestamp, the stamp position, and the network location information when the receiver end issues a verification request;

(S408) the receiver end being connected to the provider end via the network according to the network location information;

(S409) the receiver end confirming whether the identical reliable digital content exits in the provider end, wherein if the confirmation is positive, then step (S410) is executed, otherwise step (S412) is executed;

(S410) the receiver end confirming whether the reliable digital content from the provider end has the identical instant digital timestamp and the stamp position, wherein if the confirmation is positive, then step (S411) is executed, otherwise step (S412) is executed;

(S411) the receiver end confirming the reliable digital content received by the receiver end being genuine;

(S412) the receiver end confirming the reliable digital content received by the receiver end being not genuine Another embodiment of the present invention is similar to last embodiment, wherein the difference is that the receiver end is a device such as a computer, a tablet, a multimedia device, or a smart phone which is able to connect to the network. In the present embodiment, it takes computer and smart phone as the receiver end for further exemplary explanation. Also, it takes PDF as the digital content for further explanation. In the present embodiment, the digital timestamp device is an application program installed in the computer.

In this embodiment, when a user finishes a PDF by a computer, the user operates the computer to send out a stamp request to the program installed in the computer, then the program installed in the computer provides an instant digital timestamp to the computer. After that, the computer records the stamp position where the instant digital timestamp being stamped on the PDF and the network location information. The computer stores the digital content, the instant digital timestamp, the stamp position, and the network location information together as a reliable digital content. Then the smart phone retrieves the reliable digital content from the memory card or email provided by the third party. The smart phone is able to retrieve the network location information, such as IP address, for the smart phone to connect to the computer via network. Thus the smart phone is able to confirm whether the computer has the same reliable digital content. Then the smart phone confirms that if the computer has the identical reliable digital content. Once the identical reliable digital content of the computer is confirmed to have the same instant digital timestamp and stamp position, it can be sure that the reliable digital content received by the smart phone is genuine. But if any of the reliable digital content, instant digital timestamp, and stamp position, is confirmed to be not identical to the one reserved in the computer, the reliable digital content received by the smart phone is therefore confirmed to be not genuine.

As aforementioned, the present invention is able to transform the digital content into reliable digital content without the aid of a third party electric authentication service. The authenticity of the reliable digital content can be examined by the receiver end and the provider end without third party electric authentication service. The present invention provides a simple, safe, accurate, and efficient system and method for examining the truth of digital content. According to the embodiments, the digital timestamp device can be flexible as a built-in OS or an external smart watch. Besides, the external digital timestamp device and the built-in OS in the provider end can operate time synchronization.

The aforementioned descriptions are provided for explaining the preferred embodiment of the present invention but not for limiting the present invention, and all other equivalent embodiments or modification within the scope of the present invention shall be deemed as covered by the claims of the present invention.

What is claimed is:

1. An authentication method of synchronizing instant timestamp issued by a digital timestamp device, the method being applied among a digital timestamp device, a provider end, and a receiver end and comprising steps of:

the provider end providing a digital content;

the provider end requesting a stamp demand on a particular position of the digital content to the digital timestamp device;

the digital timestamp device responding to the stamp demand and to provide an instant digital timestamp to the provider end;

the provider end recording the position where the instant digital timestamp is stamped on the digital content as a stamp position; and the provider end storing the digital content, the instant digital timestamp, the stamp position, and the network location information together as a reliable digital content;

the receiver end retrieving the reliable digital content from a third party end;

the receiver end retrieving the instant digital timestamp, the stamp position, and the network location information when the receiver end issues a verification request;

the receiver end being connected to the provider end via the network according to the network location information;

the receiver end confirming whether the identical reliable digital content exits in the provider end;

the receiver end confirming whether the reliable digital content from the provider end has the identical instant digital timestamp and the stamp position when the receiver end confirms that the provider end has the identical reliable digital content; and recognizing the reliable digital content is genuine when then receiver end confirms that the received reliable digital content has the identical instant digital timestamp and the stamp position.

2. The method as claimed in claim 1, wherein when the receiver end confirms that the provider end fails to have the identical reliable digital content, the reliable digital content is recognized as not genuine.

3. The method as claimed in claim 1, wherein when the receiver end confirms that the received reliable digital content fails to have the same instant digital timestamp and the stamp position, the reliable digital content is recognized as not genuine.

* * * * *